United States Patent [19]

Tomoyasu et al.

[11] Patent Number: 4,749,494
[45] Date of Patent: Jun. 7, 1988

[54] TREATMENT OF WASTE WATER BY THE ACTIVATED SLUDGE PROCESS

[75] Inventors: Takaharu Tomoyasu, Chiba; Yuzaburo Kumagai; Shiro Honda, both of Yamaguchi; Hikoyoshi Kanayama, Chiba, all of Japan

[73] Assignee: Mitsui Sekiyu Kagaku Kogyo Kabushiki Kaisha, Tokyo, Japan

[21] Appl. No.: 940,000
[22] PCT Filed: Mar. 28, 1986
[86] PCT No.: PCT/JP86/00150
 § 371 Date: Jan. 20, 1987
 § 102(e) Date: Jan. 20, 1987
[87] PCT Pub. No.: WO86/05771
 PCT Pub. Date: Oct. 9, 1986

[30] Foreign Application Priority Data

Apr. 1, 1985 [JP] Japan .................. 60-68678

[51] Int. Cl.⁴ ................... C02F 3/20; C02F 3/30
[52] U.S. Cl. .................... 210/626; 210/630; 210/631; 210/650
[58] Field of Search ............ 210/626, 630, 612, 609, 210/631, 613, 650, 651, 195.2, 196, 202, 622

[56] References Cited

U.S. PATENT DOCUMENTS

| | | | |
|---|---|---|---|
| 3,701,727 | 10/1972 | Kormanik | 210/630 |
| 3,961,078 | 6/1976 | Stitt | 210/609 |
| 4,200,523 | 4/1980 | Balmat | 210/612 |
| 4,246,101 | 1/1981 | Selby, III | 210/615 |
| 4,392,881 | 7/1983 | Kneer | 210/630 |

FOREIGN PATENT DOCUMENTS

| | | | |
|---|---|---|---|
| 2722401 | 11/1978 | Fed. Rep. of Germany | 210/630 |
| 54-146453 | 11/1979 | Japan | 210/626 |

*Primary Examiner*—Benoit Castel
*Attorney, Agent, or Firm*—Wenderoth, Lind & Ponack

[57] ABSTRACT

An activated sludge treatment process for waste water characterized in that, in the waste water treatment where waste water containing organic matter is introduced into an activated sludge reaction tank and the excess sludge formed in the reaction tank is introduced into a sludge digestion tank to effect the digestion of said excess sludge by intermittent aeration with air, a part of the digestion tank liquid is passed through a filtration apparatus having an ultrafiltration membrane, the filtrate passed therethrough is withdrawn outside the system, the remainder is circulated to the digestion tank to maintain the liquid volume of the digestion tank at a definite level, and when the amount of the reaction tank liquid introduced from the reaction tank into the digestion tank is taken as $W_1$, the digestion tank liquid is returned in an amount of $(0.2-0.8)W_1$ to the reaction tank, and thus the amount of excess sludge to be treated outside the system can be reduced or can be completely eliminated.

7 Claims, 1 Drawing Sheet

TREATMENT OF WASTE WATER BY THE ACTIVATED SLUDGE PROCESS

FIELD OF THE INVENTION

This invention relates to sludge treatment processes for waste water containing organic matter, wherein the waste water is purified by the use of activated sludge. More particularly, in a sludge treatment process where an excess sludge formed in an activated sludge reaction tank (hereinafter called the reaction tank) is introduced into a sludge digestion tank (hereinafter called the digestion tank) to digest the excess sludge, the invention is concerned with the activated sludge treatment process for waste water containing organic matter, which process is capable of lessening or completely inhibiting an ultimate formation of the excess sludge by employing specific conditions under which the process is carried out.

BACKGROUND OF THE INVENTION

So-called activated sludge treatment processes which comprise introducing waste water into the reaction tank in which activated sludge is present followed by aeration are widely used as a purification treatment process for waste water containing organic matter.

In the operation of the activated sludge treatment process, however, an excess sludge is formed inevitably in the reaction tank, necessitating treatment of the excess sludge by a use of the dehydrator. Because of large amounts of the excess sludge formed in the standard reaction tank, this process sometimes involves additionally the digestion treatment of the excess sludge under anaerobic and/or aerobic condition in a digestion tank. In this respect, refer to Journal of Sewage Association, 22 (248), 42 (1985), for example.

Alternatively, the amount of excess sludge formed is lessened in some cases by employing the so-called long time aeration process wherein the capacity of the reaction tank is sufficiently increased to reduce the sludge load.

In practicing the dehydration of sludge by the use of the dehydrator, however, the cost of initial equipments to be provided therefor is great and much skill is required in many cases for operating the dehydrator and, moreover, there is such a problem that for the disposal of the dehydrated sludge, there is no other alternative but to incinerate the dehydrated sludge to be disposed of or use the same for land reclamation.

In practicing the digestion of excess sludge, on one hand, an aerobic digestion process employed therefor, which process effects the digestion of excess sludge under conditions where oxygen is sufficiently present, involves such a problem that the digestibility attained thereby is as low as about 2-4% per day and accordingly a large sized digestion tank must be used if the amount of excess sludge formed is large. Furthermore, in an anaerobic digestion process wherein the digestion of the formed excess sludge is carried out under conditions where oxygen is deficient, the digestibility attained is as high as about 10% per day. This process, however, involves such a problem that because undigested sludge aggregates and decreases in dehydration properties, disposal of the undigested sludge to be discarded becomes difficult, or a bad smell is emitted, or simplification of the equipment to be employed is difficult. In either of the above-mentioned digestion processes, moreover, there is involved such a serious problem that the rate of digestion markedly decreases at the time when 45-50% of the excess sludge has been digested, and when the digested excess sludge exceeds 55%, the self-digestion coefficient decreases, resulting in practical nonfulfillment of digestive function.

For these reasons, under the present circumstances involving the above-mentioned prior art processes, even when the excess sludge is digested by the use of the digestion tank, about half of the amount of excess sludge formed in the reaction tank remains undigested.

Where the log time aeration process is intended to treat the excess sludge, on one hand, there is such a problem that a large-sized reaction tank must be used and consequently the space allotted to said reaction tank naturally becomes large and, moreover, a large energy consumption is needed for maintaining large amounts of aeration required for the purpose intended.

DISCLOSURE OF THE INVENTION

The present invention is intended to solve such problems associated with the prior art processes as mentioned above and is characterized by the fact that excess sludge formed in the reaction tank is introduced, either continuously or intermittently according to a predetermined cycle, into the digestion tank which is then aerated intermittently to propagate facultative anaerobic bacteria, the excess sludge introduced into the digestion tank is digested by the aid of the propagated facultative anaerobic bacteria and, at the same time, the digestion tank liquid containing digested sludge is separated through an ultrafiltration apparatus into a filtrate and the digested sludge, the filtrate thus separated is removed out of the system and, at the same time, the remainder is recycled to the digestion tank, and a specific amount of the digestion tank liquid is returned to the reaction tank.

According to the present invention, it is possible to reduce the amount of excess sludge to be treated outside the system or dispense with such excess sludge since in the operation of an activated sludge system in accordance with the invention, waste water containing organic matter is introduced into an activated sludge reaction tank to treat therewith, the excess sludge resulted therefrom is introduced into a sludge digestion tank, this digestion tank is aerated intermittently to propagate facultative anaerobic bacteria and thereby to digest the excess sludge and, at the same time, the digestion tank liquids containing the digested sludge is separated through an ultrafiltration apparatus into a filtrate and the digested sludge, the filtrate is removed outside the system and, at the same time, the remainder is recycled to the digestion tank, and a part of the digestion tank liquid is returned to the aforesaid reaction tank.

BEST MODE OF THE INVENTION

Figure 1:
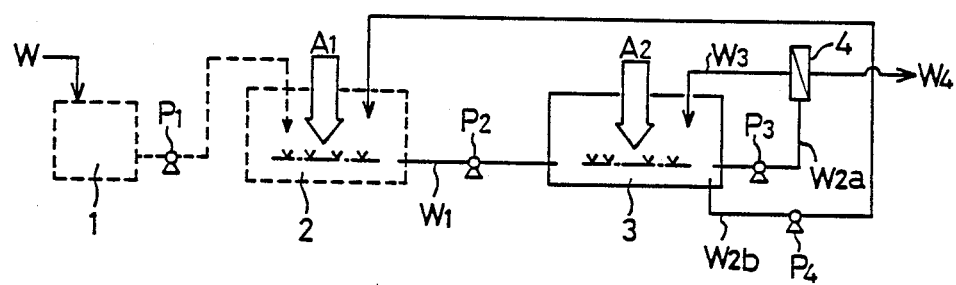
FIG. 1 is a schematic view illustrating a continuous process for the treatment of waste water with activated sludge in accordance with the present invention.

The present invention is illustrated below in detail with reference to the accompanying drawing.

Waste water W containing organic matter to be treated is introduced by a feed pump $P_1$ from a waste water storage tank 1 into an activated sludge reaction tank 2. In this reaction tank 2, activated sludge, which is a suspension of aerobic microorganisms, is present, and the reaction tank 2 is aerated with air $A_1$ to carry out an activated sludge treatment within the reaction tank 2.

When the operation proceeds in this manner, excess sludge is formed within the reaction tank 2. The excess sludge thus formed is introduced by a feed pump $P_2$ from the reaction tank 2 into an activated sludge digestion tank 3. The amount $W_1$ of the reaction tank liquid containing the excess sludge to be introduced from the reaction tank 2 into the digestion tank 3 is desirably 1.5–20, preferably 3–10 times the amount (m³/day) obtained by converting the amount (dry weight) of the excess sludge formed in the reaction tank 2 without using the digestion tank 3 to the concentration of sludge of the reaction tank. In introducing the reaction tank liquid from the reaction tank 2 into the digestion tank 3, it is also possible to pass said reaction tank liquid through an ultrafiltration apparatus (not shown) attached to said reaction tank, and thus it becomes possible to adjust with ease, the concentration of activated sludge in the reaction tank.

The digestion tank 3 into which the reaction tank liquid $W_1$ containing excess sludge has been introduced is aerated intermittently with air $A_2$. The aeration with the air $A_2$ is effected by repeating such a cycle that the aeration time is 0.1–10, preferably 1–10 hours and more preferably 3–6 hours, and the non-aeration time is 0.06–10, preferably 2–10 hours and more preferably 4–7 hours. If the non-aeration time for the digestion tank 3 is less than 0.06 hour, the dissolved oxygen content in the digestion tank liquid is difficult to decrease to a level of less than 0.5 mg/l and the retention of facultative anaerobic bacteria which will be mentioned later becomes difficult. Thus, it is not preferable to use such non-aeration time as no digestive ability can be maintained over an extended period. On the other hand, a non-aeration time exceeding 10 hours is not preferable since putrefaction takes place in the digestion tank and foul odor is apt to emanate therefrom.

By virtue of the intermittent aeration with the air $A_2$ of the digestion tank 3 into which the reaction tank liquid $W_1$ containing excess sludge has been introduced, the facultative anaerobic bacteria are selectively propagated within the digestion tank, and the excess sludge is efficiently digested in the presence of the propagated facultative anaerobic bacteria.

The sludge concentration in the digestion tank 3 is adjusted desirably to 2000–20000 mg/l, preferably 8000–15000 mg/l. The capacity of the digestion tank 3, i.e. the real liquid volume [m³], is desirably 2–40, preferably 4–10 times the amount $W_1$ of the reaction tank liquid containing excess sludge to be introduced into this digestion tank 3. By virtue of using the digestion tank having a capacity falling within the abovementioned ranges, the retention time of excess sludge in the digestion tank is determined and a favorable digestive efficiency can be attained.

The lower limit of the sludge concentration within the digestion tank 3 is necessarily the sludge concentration in the reaction tank 2, and this lower limit is usually about 2000 mg/l. When the sludge concentration in the digestion tank 3 exceeds 20,000 mg/l, the digestion liquid excessively increases in viscosity and the filtration thereof becomes difficult, when subjected to ultrafiltration, and thus attaining such a high sludge concentration in the digestion tank is not preferred. Where the capacity of the digestion tank 3 is less than 2 times the amount $W_1$ of the reaction tank liquid containing excess sludge to be introduced into the digestion tank 3, it becomes difficult to maintain the balance of sludge concentration in the digestion tank as the amount of sludge to be digested is small. On the other hand, the said capacity in excess of 40 times the said amount $W_1$ is not preferred since the pH of the digestion liquid tank decreases to less than 4 and no digestive ability of the facultative anaerobic bacteria can be maintained for a long period of time.

The digestion tank liquid in the digestion tank 3 desirably has a pH of 4–8, preferably 5–7, and the temperature of the digestion tank liquid is desirably 10°–40° C., preferably 20°–35° C.

In this manner, the excess sludge within the digestion tank 3 is digested by the facultative anaerobic bacteria. In that case, the digestion tank liquid $W_{2a}$ containing the digested sludge within the digestion tank 3 is introduced by a feed pump $P_3$ into a filtration apparatus 4 having an ultrafiltration membrane, wherein the digestion tank liquid is separated into a filtrate $W_4$ and the remainder $W_3$ containing the digested sludge, and this remainder $W_3$ containing the digested sludge is circulated again into the digestion tank 3. The filtrate $W_4$ containing no sludge is excluded out of the system.

The amount of the filtrate $W_4$ excluded from the digestion tank 3 through the filtration apparatus 4 is desirably maintained so that said amount becomes almost equal to a value obtained by deducting the digestion tank liquid $W_{2b}$ to be returned from the digestion tank 3 to the reaction tank 2 as will be mentioned later from the amount $W_1$ of the reaction tank liquid containing excess sludge to be introduced from the reaction tank 2 into the digestion tank 3. By virtue of maintaining the amount of the filtrate $W_4$ in this manner, the amount of the digestion tank liquid within the digestion tank 3 can be kept practically at a definite level.

In the present invention, moreover, the digestion tank liquid $W_{2b}$ containing the digested sludge is returned, either continuously or intermittently, by a feed pump $P_4$ from the digestion tank 3 to the reaction tank 2. Because the digestion tank 3 is aerated intermittently with the air $A_2$, the digestion tank liquid $W_{2b}$ contains large amounts of the facultative anaerobic bacteria and this sludge is easily activated in an aerobic atmosphere in the reaction tank 2 and, at the same time, said sludge is more activated by contact with a fresh waste water containing organic matter.

In case where the digestion tank is not aerated at all, the sludge of the digestion tank consists essentially of absolute anaerobic bacteria and said sludge is not activated even when it is returned to the reaction tank, exerting an adverse influence on the activated sludge reaction in the reaction tank. Where the digestion tank is continuously aerated, the sludge of the digestion tank consists essentially of aerobic bacteria and hence the digestibility decreases.

The amount [m³/day] of the digestion tank liquid $W_{2b}$ to be returned from the digestion tank 3 to the reaction tank 2 is desirably 0.2–0.8, preferably 0.3–0.5 times the amount $W_1$[m³/day] of the reaction tank liquid containing the excess sludge to be introduced from the reaction tank 2 into the digestion tank 3. By virtue of maintaining the amount of the digestion tank liquid $W_{2b}$ in the above-mentioned range, the self-digestibility coefficient [day$^{-1}$] of the excess sludge can be maintained at 0.01 [day$^{-1}$] or higher, preferably 0.05 [day$^{-1}$] or higher.

The present invention is illustrated below with reference to examples, but it should be construed that the invention is in no way limited to these examples.

EXAMPLE 1

Waste water was introduced at a rate of 1.44 m³day (60 l/h) containing 0.3 kg/day of BOD into a reaction tank having a capacity of a real liquid volume of 240 l, while maintaining a concentration of activated sludge in the reaction tank at 6000 mg/l.

A reaction tank liquid containing excess sludge was sent under pressure at a rate of 30 l/day to a digestion tank having a capacity of 120 l, while maintaining the sludge concentration at 15,000 mg/l. Some of the digestion tank liquid was returned at a rate of 6 l/day from the digestion tank to the reaction tank. Other digestion tank liquid was passed through a filtration apparatus having an ultrafiltration membrane (Iris ®, a product of Rhone-Poulenc) to effect circulation filtration of the sludge of the digestion tank so that the concentration of said sludge is maintained, and filtrate was withdrawn therefrom at a rate of 24 l/day. In the digestion tank, aeration for 6 minutes and non-aeration for 4 minutes were repeated. As the result, facultative anaerobic bacteria were selectively propagated in the digestion tank, and an aerobic atmosphere was insured within the reaction tank. Even when the waste water of 1.44 m³/day was treated, the filtrate contained BOD of less than 5 mg/l with no sludge.

Moreover, although the excess sludge was not withdrawn even once during a 30-day operation outside the system, no change in the total amount of sludges in the reaction tank and digestion tank was observed.

EXAMPLE 2

Waste water was introduced at a rate of 1.44 m³/day (60 l/h) containing 0.3 kg/day of BOD into a reaction tank having a capacity of a real liquid volume of 240 l, while maintaining an activated sludge concentration (MLSS) in the reaction tank at 6000 mg/l.

A reaction tank liquid containing excess sludge was sent under pressure at a rate of 30 l/day from the reaction tank to a digestion tank having a capacity of a real liquid volume of 120 l, while maintaining the sludge concentration at 15,000 mg/l. Some digestion tank liquid was returned from the digestion tank at a rate of 6 l/day to the reaction tank. Other reaction rank liquid was passed through a filtration apparatus having an ultrafiltration membrane (Iris ®, a product of Rhone-Poulenc) to effect circulation filtration of the sludge of the digestion tank so that the concentration of said sludge is maintained, and the filtrate was withdrawn therefrom at a rate of 24 l/day. In the digestion tank, aeration for 4 hours and non-aeration for 6 hours were repeated.

As the result, facultative anaerobic bacteria were selectively propagated in the digestion tank, and an aerobic atmosphere was insured within the reaction tank. Even when the waste water of 1.44 m³/day was treated, the filtrate contained BOD of less than 5 mg/l with no sludge contained therein.

Moreover, although the excess sludge was not withdrawn even once during a 30-day operation outside the system, no change in the toal amount of sludges in the reaction tank and digestion tank was observed.

EXAMPLE 3

In a system similar to that of Example 2, waste water containing 200 mg/l of BOD (0.288 kg/day), 10 mg/l of total nitrogen, 2 mg/l of total phosphate and no suspended solids was continuously supplied to a reaction tank having a capacity of a real liquid volume of 270 l at a rate of 1.44 m³/day for 24 hours.

The sludge concentration in the reaction tank was maintained at 5000 mg/l by passing a reaction tank liquid through an ultrafiltration apparatus (not shown in the drawing) attached to the reaction tank. The filtrate passed through the ultrafiltration apparaus contained BOD of a value of less than 5 mg/l.

A reaction tank liquid was transferred from the reaction tank at a rate of 20 l/day to a digestion tank having a capacity of a real liquid volume of 120 l. The filtrate obtained by circulating some of the digestion tank liquid to the ultrafiltration apparatus having an ultrafiltration membrane was withdrawn at a rate of 9 l/day outside the system, and the remainder containing the digested sludge was recycled to the digestion tank.

In the digestion tank, aeration for 4 hours and non-aeration for 6 hours were repeated.

Other digestion tank liquid was returned from the digestion tank to the reaction tank at a rate of 11 l/day.

As the result, the activated sludge concentration in the digestion tank became 8000 mg/l, and although the withdrawal of excess sludge from the system to the exterior was not effected even once, the sludge concentration in the digestion tank maintained practically the same value for 4 months. If the digestion in the digestion tank was not carried out at all, the activated sludge concentration in the digestion tank was calculated to become 18,000 mg/l, and thus the sludge digestion system of the present invention was demonstrated to be effective.

In this system, when the above-mentioned waste water was treated only with the reaction tank without using the digestion tank, the amount of the reaction tank liquid containing excess sludge to be withdrawn from the reaction tank every day was 2.5 l/day in order to maintain the liquid volume of the reaction tank and the activated sludge concentration at 5000 mg/l. Accordingly, the liquid amount of 20 l to be introduced from the reaction tank into the digestion tank corresponded to about 8 times the amount of excess sludge formed.

COMPARATIVE EXAMPLE 1

Example 3 was repeated except the amount of reaction tank liquid introduced from the reaction tank into the digestion tank was 5 l/day and the amount of the digestion tank liquid returned from the digestion tank to the reaction tank was 4 l/day, whereupon the sludge concentration in the reaction tank gradually increased.

COMPARATIVE EXAMPLE 2

Example 3 was repeated except the amount of the reaction tank liquid introduced from the reaction tank into the digestion tank was 40 l/day and the amount of the digestion tank liquid returned from the digestion tank to the reaction tank was 6 l/day, whereupon the sludge concentration in the digestion tank gradually increased.

COMPARATIVE EXAMPLE 3

When the waste water used in Example 2 was treated with only the reaction tank without using the digestion tank at all, the reaction tank liquid containing excess sludge had to be withdrawn every day from the reaction tank at a rate of 10 l/day in order to maintain the liquid volume of the reaction tank at 240 l and the activated sludge concentration at 6000 mg/l.

INDUSTRIAL POSSIBILITY OF THE INVENTION

According to the activated sludge treatment process for waste water of the present invention, by virtue of treating waste water containing organic matter with the present process, the ultimate formation of excess sludge can be markedly reduced or completely inhibited. Accordingly, there is no need of dehydrating and drying the excess sludge, or there is no need of incinerating the dried excess sludge.

In this manner, the activated sludge treatment process of the present invention in quite effective in treating waste water containing organic matter.

We claim:

1. A process for treating waste water, which comprises:
   introducing waste water containing organic matter into an activated sludge reaction tank;
   forming a reaction tank liquid containing excess sludge in the reaction tank;
   intoducing the reaction tank liquid containing the excess sludge into a sludge digestion tank, wherein the sludge concentration in the digestion tank is 2000–20000 mg/l;
   aerating the digestion tank intermittently with air to form a digestion tank liquid containing digested sludge, wherein the aeration time is 0.1–10 hours and the non-aeration time is 0.06–10 hours;
   introducing a portion of the digestion tank liquid containing the digested sludge into an ultrafiltration apparatus having an ultrafiltration membrane to separate a filtrate and the digested sludge;
   removing the filtrate out of the system;
   recycling the digested sludge to the digestion tank to maintain the amount of the digestion tank liquid at a definite level; and
   where the amount of the reaction tank liquid introduced from the reaction tank into the digestion tank is taken as $W_1$, returning a portion of the digestion tank liquid from the digestion tank to the reaction tank in the amount of $(0.2-0.8)W_1$.

2. The process as claimed in claim 1 wherein the amount $W_1$ of the reaction tank liquid to be introduced from the reaction tank into the digestion tank is 1.5–20 times the amount obtained by converting the amount of excess sludge (dry weight) formed, when the digestion tank is not used, to the concentration of sludge of the reaction tank.

3. The process as claimed in claim 1 wherein the amount $W_1$ of the reaction tank liquid to be introduced from the reaction tank into the digestion tank is 3–10 times the amount obtained by converting the amount of excess sludge (dry weight) formed, when the digestion tank is not used, to the concentration of sludge of the reaction tank.

4. The process as claimed in claim 1 wherein the capacity of the digestion tank, when the reaction tank liquid introduced from the reaction tank into the digestion tank is taken as $W_1$, is $(2-40)W_1$.

5. The process as claimed in claim 1 wherein the sludge concentration in the digestion tank is 8000–15000 mg/l.

6. The process as claimed in claim 1 wherein the intermittent aeration of the digestion tank with air is effected in such a manner that the aeration time is 3–6 hours and the non-aeration time is 4–7 hours.

7. The process as claimed in claim 1 wherein the amount of the digestion tank liquid returned from the digestion tank to the reaction tank is 0.3–0.5 times the amount $W_1$ of the reaction tank liquid introduced from the reaction tank into the digestion tank.

* * * * *